(12) United States Patent
Masuda

(10) Patent No.: US 9,195,311 B2
(45) Date of Patent: Nov. 24, 2015

(54) IMAGING DEVICE, IMAGING METHOD, AND PROGRAM WITH FLICK GESTURE TO ACQUIRE AN IMAGE

(71) Applicant: FUJIFILM Corporation, Tokyo (JP)

(72) Inventor: Ken Masuda, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 121 days.

(21) Appl. No.: 13/779,790

(22) Filed: Feb. 28, 2013

(65) Prior Publication Data

US 2013/0257762 A1 Oct. 3, 2013

(30) Foreign Application Priority Data

Mar. 27, 2012 (JP) ................. 2012-070975
Jan. 23, 2013 (JP) ................. 2013-009976

(51) Int. Cl.
*G06F 3/0488* (2013.01)
*G06F 3/01* (2006.01)
*G03B 17/38* (2006.01)
*H04N 5/232* (2006.01)

(52) U.S. Cl.
CPC .............. *G06F 3/017* (2013.01); *G03B 17/38* (2013.01); *G06F 3/04883* (2013.01); *H04N 5/23216* (2013.01)

(58) Field of Classification Search
CPC ............... G06F 3/041; G06F 3/0416; G06F 3/0484–3/04847; G06F 3/04883; G06F 2203/04808; H04N 5/23248; H04N 5/23264–5/23277; H04N 5/2329; H04N 5/2353
USPC ............ 345/173–178; 348/208.99, 348/208.3–208.6, 208.12–208.13, 362–368
See application file for complete search history.

(56) References Cited

U.S. PATENT DOCUMENTS

| 5,923,908 | A | * | 7/1999 | Schrock et al. | ................. 396/85 |
| 2006/0055662 | A1 | * | 3/2006 | Rimas-Ribikauskas et al. | ............................. 345/156 |
| 2009/0245685 | A1 | * | 10/2009 | Makii | ......................... 382/276 |
| 2010/0283743 | A1 | * | 11/2010 | Coddington | .................. 345/173 |
| 2011/0019058 | A1 | * | 1/2011 | Sakai et al. | ............. 348/333.01 |
| 2012/0146929 | A1 | | 6/2012 | Oyama | |

FOREIGN PATENT DOCUMENTS

| JP | 2009-105919 | 5/2009 |
| JP | 2010-035107 | 2/2010 |
| JP | 2010-160581 | 7/2010 |
| JP | 2011-039990 | 2/2011 |
| JP | 2011-205228 | 10/2011 |
| JP | 2012-010061 | 1/2012 |

OTHER PUBLICATIONS

Japanese Official Action—2013-009976—Feb. 18, 2014.

* cited by examiner

*Primary Examiner* — Liliana Cerullo
(74) *Attorney, Agent, or Firm* — Young & Thompson

(57) ABSTRACT

An imaging device includes a touch panel adapted to receive an instruction entered with a touch operation performed by a user touching his/her finger to a screen, a touch operation detector adapted to detect the touch operation entered through the touch panel, an image acquirer adapted to acquire an image, and an imaging controller adapted to effect control such that the image acquirer acquires the image when the touch operation detector detects a flick operation, as the touch operation, whereby the user lifts his/her finger off the screen of the touch panel after moving the finger over the screen, with the finger kept in contact with the screen.

24 Claims, 7 Drawing Sheets

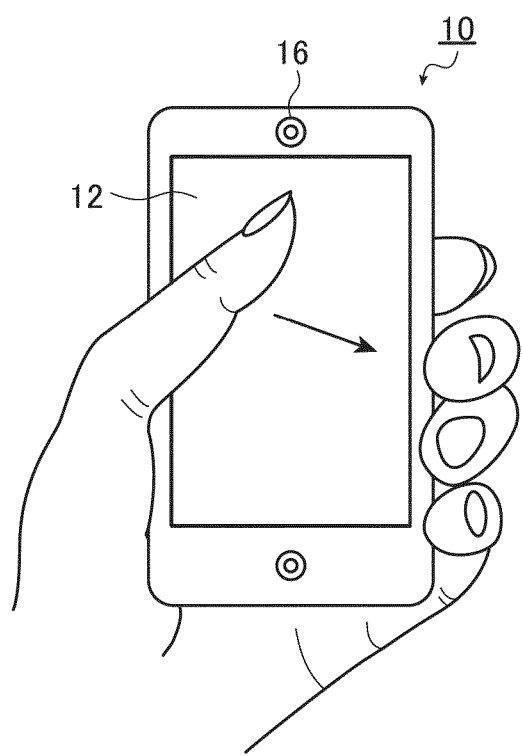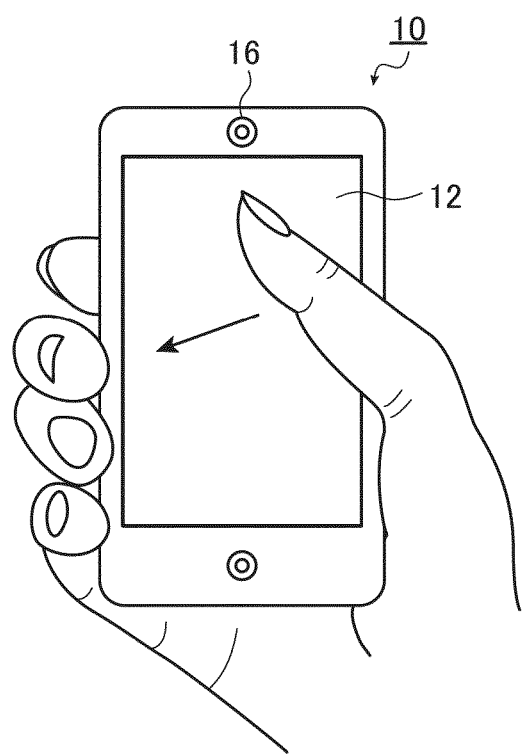

IMAGING DEVICE, IMAGING METHOD, AND PROGRAM WITH FLICK GESTURE TO ACQUIRE AN IMAGE

BACKGROUND OF THE INVENTION

The present invention relates to an imaging device, an imaging method, and a program for taking a photograph (acquiring an image) with a touch operation that is entered through a touch panel.

With an imaging device such as a film camera and a digital camera, a photograph is taken by pressing the shutter button in a direction perpendicular to the direction of the line connecting a subject to be photographed and the camera. In addition, the focus can be locked by pressing the shutter button halfway.

With a portable terminal such as a mobile telephone and a smartphone having a camera function, a photograph is taken by pressing the shutter button in the direction of the line connecting a subject to be photographed and the camera and, therefore, the distance between the subject and the portable terminal may cause a shake. In addition, the halfway push function is not provided.

When, for example, a user holds a portable terminal in his/her right hand and presses the shutter button with the right thumb, the point to which force is applied tends to move in a direction in which the shutter button is pressed, so that the portable terminal tends to face upward or downward, increasing the chance of occurrence of a vertical camera shake.

The camera shake tends to occur more easily as the camera-to-subject distance (user's arm length) shortens as when the user takes a self-portrait, that is, takes a photograph of himself/herself, alone or with his/her friends, in which case, the user as a subject may sometimes move out of the imaging region.

Further, when the user presses the shutter button, taking a photograph representing a movement by intentionally moving the imaging device or himself/herself is difficult.

Among prior art literature related to the present invention are JP 2011-205228 A, JP 2011-39990 A, JP 2010-160581 A, JP 2010-35107 A, and JP 2009-105919 A.

JP 2011-205228 A describes an imaging device having a function of correcting the values of given imaging conditions and an auto-bracketing function of successively taking photographs over a plurality of times while changing the values of given imaging conditions, whereby when a plurality of touches are simultaneously detected on the touch panel, corrected values of given imaging conditions and bracket values for auto-bracketing function using the corrected values as reference are set based on the touched positions.

JP 2011-39990 A describes an information processing apparatus, wherein control is effected such that if a time period of continuous touch has not reached a given time period when a touch-up is detected from a state in which a touch on a display means in a given area has been detected, a function assigned to the given area is executed whereas if a time period of continuous touch has reached a given time period when a touch-up is detected from a state in which a touch on a display means in a given area has been detected, a function assigned to the given area is not executed.

JP 2010-160581 A describes an interface device, in which a plurality of adjustment items for quality adjustment of a content as an object to be dealt with are displayed on a monitor screen, a drag operation over the touch panel is detected, an adjustment item for which the drag operation has been performed is selected as an adjustment item of quality adjustment, and setting is made to increase or reduce the conditions for the adjustment items depending on whether the adjustment item is the start point or the end point of the drag operation.

JP 2010-35107 A describes an imaging device that detects operation of an operating button of the imaging device displayed in the display region of a touch panel in response to a signal entered through the touch panel and causes a given operation assigned to the operating button to be performed.

JP 2009-105919 A describes an operating device that causes operating buttons to be displayed about a pressed position on the touch panel and, when a displayed operating button is pressed through the touch panel, performs an operation control corresponding to the pressed operating button.

SUMMARY OF THE INVENTION

A first object of the invention is to overcome the above problems associated with the prior art and provide an imaging device, an imaging method, and a program capable of reducing occurrence of camera shake.

In addition to the first object, a second object of the invention is to provide an imaging device, an imaging method, and a program enabling an image representing a movement to be acquired.

To achieve the above objects, the present invention provides an imaging device comprising:
a touch panel adapted to receive an instruction entered by a user with a touch operation by touching his/her finger to a screen,
a touch operation detector adapted to detect the touch operation entered through the touch panel,
an image acquirer adapted to acquire an image, and
an imaging controller adapted to effect control such that the image acquirer acquires the image when the touch operation detector detects a flick operation, as the touch operation, in which a user lifts his/her finger off a screen of the touch panel after moving the finger over the screen, with the finger kept in contact with the screen.

The present invention also provides an imaging method comprising:
an instruction input step of receiving an instruction entered by a user with a touch operation by touching his/her finger to a screen of a touch panel,
a touch operation detection step of detecting the touch operation entered in the instruction input step, and
an imaging control step of effecting control such that the image is acquired when a flick operation is detected as the touch operation in the touch operation detection step, in which flick operation the user lifts his/her finger off the screen of the touch panel after moving the finger over the screen with the finger kept in contact with the screen.

Further, the present invention provides a non-transitory computer readable recording medium having recorded thereon a program adapted to cause a computer to execute each of the steps of the imaging method described above.

According to the present invention, because the role of the shutter button can be played by a flick operation that is achieved by a light touch on the touch panel, occurrence of camera shake can be reduced. In addition, a flick operation, which is performed in a direction perpendicular to the direction of a line connecting the subject and the camera, greatly reduces camera shake attributable to the distance between subject and camera, particularly camera shake occurring when an imaging device is used to take a self-portrait.

According to the present invention, an image representing a movement can be taken by acquiring a plurality of images successively as the imaging device is slightly moved by an unconscious motion on the part of the user or intentionally moved by a user or as the user himself/herself moves deliberately.

BRIEF DESCRIPTION OF THE DRAWINGS

FIGS. 3A and 3B are conceptual diagrams illustrating flick operations performed with the left thumb and the right thumb, respectively.

DETAILED DESCRIPTION OF THE INVENTION

The imaging device, the imaging method, and the program of the invention are described in detail below with reference to preferred embodiments shown in the accompanying drawings.

Figure 1A:
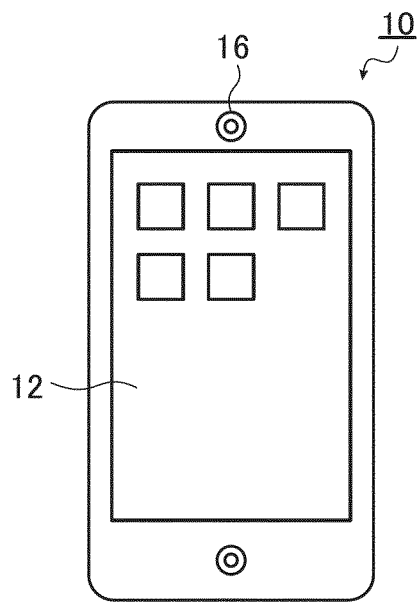
FIGS. 1A and 1B are conceptual diagrams of an embodiment illustrating an external appearance of the imaging device of the present invention.
Figure 1B:
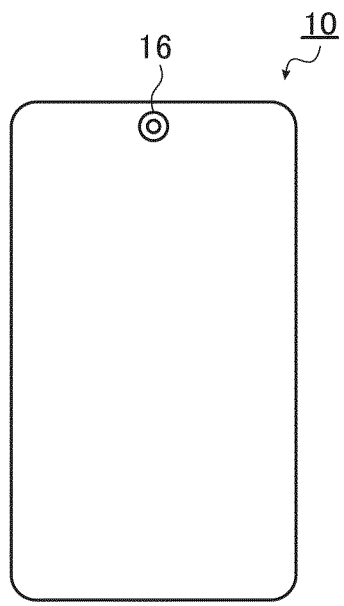
Figure 2:
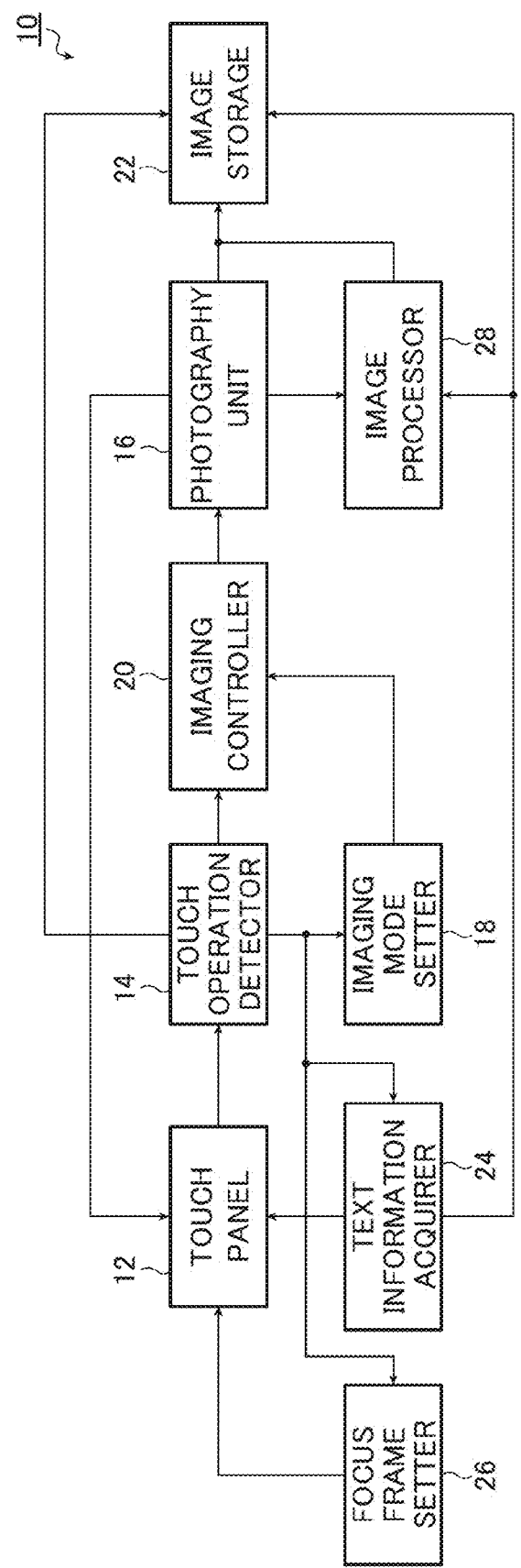
FIG. 2 is a block diagram illustrating a configuration of the imaging device shown in FIG. 1.

FIGS. 1A and 1B are conceptual diagrams of an embodiment illustrating an external appearance of the imaging device of the present invention; FIG. 2 is a block diagram illustrating a configuration of the imaging device shown in FIG. 1. An imaging device 10 illustrated in FIG. 1 is a portable terminal having a function of taking a photograph such as a smartphone and comprises a touch panel 12, a touch operation detector 14, a photography unit 16, an imaging mode setter 18, an imaging controller 20, an image storage 22, a text information acquirer 24, a focus frame setter 26, and an image processor 28, as illustrated in FIG. 2.

The touch panel 12 is provided on the front side of the imaging device 10 as illustrated in FIG. 1A.

The touch panel 12 comprises a combination of a display device adapted to display information such as liquid crystal panel and a location entering device such as touch pad. The touch panel 12 displays various information and receives a user's instructions entered with a touch operation performed by touching the screen with a finger.

The touch panel 12 may be of resistive film type, capacitive type, or any other appropriate type selected from a variety of types available, provided that instructions can be entered by touch operation.

The touch operation detector 14 detects a touch operation entered by the user via the touch panel 12.

The photography unit (image acquirer) 16 is a device such as a camera adapted to take a photograph (image) and, in this embodiment, is provided on the front and the reverse side of the imaging device 10 as illustrated in FIGS. 1A and 1B. The camera on the front side is used to take a self-portrait; the camera on the reverse side is used to photograph subjects in general.

Upon taking a photograph, an image acquired by the photography unit 16 is displayed on the screen of the touch panel 12.

The imaging mode setter 18 sets an imaging mode in which the photography unit 16 takes a photograph according to the user's instruction given with a touch operation. The imaging mode is described in detail later.

The imaging controller 20 effects control such that when the touch operation detector 14 detects a flick operation, which is a touch operation whereby a user lifts his/her finger off the screen of the touch panel 12 after moving (sliding) the finger over the screen, with the finger kept in contact with the screen, the photography unit 16 takes a photograph according to an imaging mode that is set by the imaging mode setter 18.

The text information acquirer 24, upon the touch operation detector 14 detecting a flick operation, causes an entry region for entering text information including a title of and a comment on a photograph taken by the photography unit 16 to be displayed in an area over which the user moved his/her finger kept in contact with the screen of the touch panel 12 to acquire text information on the photograph entered by the user in the entry region.

The focus frame setter 26, upon the touch operation detector 14 detecting the user's two fingers placed in contact with the screen of the touch panel 12, causes a focus frame for determining a focusing position in the imaging region to be displayed in the screen of the touch panel 12 and, when the user moves the two fingers kept in contact with the screen of the touch panel 12, causes the focus frame to move according to the two fingers' moving direction.

The image processor 28 applies given image processing to a photograph taken by the photography unit 16.

The image processor 28 performs image processings including attaching the text information acquired by the text information acquirer 24 to a photograph taken by the photography unit 16 as a character image (image synthesis) and reversing the portrait orientation of a photograph taken by the photography unit 16 with the imaging device 10 positioned upside downward.

The image storage 22 stores image data of a photograph taken by the photography unit 16 after the user lifts his/her finger off the touch panel 12 upon completing a flick operation or image data of a photograph having undergone image processing by the image processor 28.

Further, the image storage 22 stores text information acquired by the text information acquirer 24 as tag information of the image data of a photograph stored by the image storage 22 and uses the tag information as a file name of the image data.

Next, the imaging mode is described in detail.

The imaging mode setter 18 permits imaging modes including an imaging mode for taking one photograph with a single flick operation and an imaging mode for continuously taking a plurality of photographs with a single flick operation.

In the imaging mode for taking one photograph, one photograph is taken under given imaging conditions.

In this imaging mode, a photograph can be taken with a multiple exposure by performing a multiple flick operation whereby the user repeats the steps of moving his/her finger over the screen of the touch panel 12 with the finger kept in contact with the screen, stopping moving the finger, and moving the finger back in the opposite direction with the finger kept in contact with the screen.

In this imaging mode, the shutter speed at which the photography unit 16 takes a photograph can be changed according to the speed at which the user moves his/her finger in a flick operation. More specifically, when the user moves the finger in a flick operation at a high speed, a photograph is taken with the shutter speed set to a high speed; when the finger movement speed is low, a photograph is taken with the shutter speed set to a low speed.

Thus, with the imaging device 10, a flick operation can be used not only as a shutter button to take a photograph but to designate imaging conditions for taking a photograph.

In a first imaging mode for taking a plurality of photographs with a single flick operation, a plurality of photographs are successively taken under the same given imaging conditions. When a plurality of photographs are taken successively under the same imaging conditions, photographs representing slight movements can be taken as the imaging device 10 is slightly moved by an unconscious motion on the part of the user or intentionally moved by the user or as the user himself/herself moves deliberately.

In a second imaging mode for taking a plurality of photographs with a single flick operation, a plurality of photographs are successively taken with the shutter speed changed. In this imaging mode, when, for example, three photographs are taken with a single flick operation, the shutter speed setting is so made that the shutter speed sequentially changes from a low and a medium to a high speed in this order, taking one photograph at each shutter speed, thus taking a total of three photographs successively.

In a third imaging mode for taking a plurality of photographs with a single flick operation, given image processing is applied to the photographs thus taken. In this imaging mode, when three photographs are likewise taken with a single flick operation, a first taken photograph undergoes color image processing, a second taken photograph undergoes monotone image processing, and a third taken photograph undergoes image processing to provide the photograph with a look of painting.

In a fourth imaging mode for taking a plurality of photographs with a single flick operation, a plurality of photographs are successively taken each either with or without flash. In this imaging mode, when three photographs are likewise taken with a single flick operation, the flash setting is so made that photographs are taken sequentially with flash, without flash, and with flash in this order, taking one photograph each time the flash setting changes, as a total of three photographs are taken successively.

With a touch operation, the user can cause the selection screen for selecting the imaging conditions and the image processing conditions the respective imaging modes to be displayed at a desired timing and switch the setting as when operating on the screen for selecting the imaging mode. The shutter speed setting, the image processing setting, and the flash setting are not limited to the above examples and may be as desired, and the order in the setting may also be as desired. Further, another imaging mode may be additionally provided.

Figure 4:
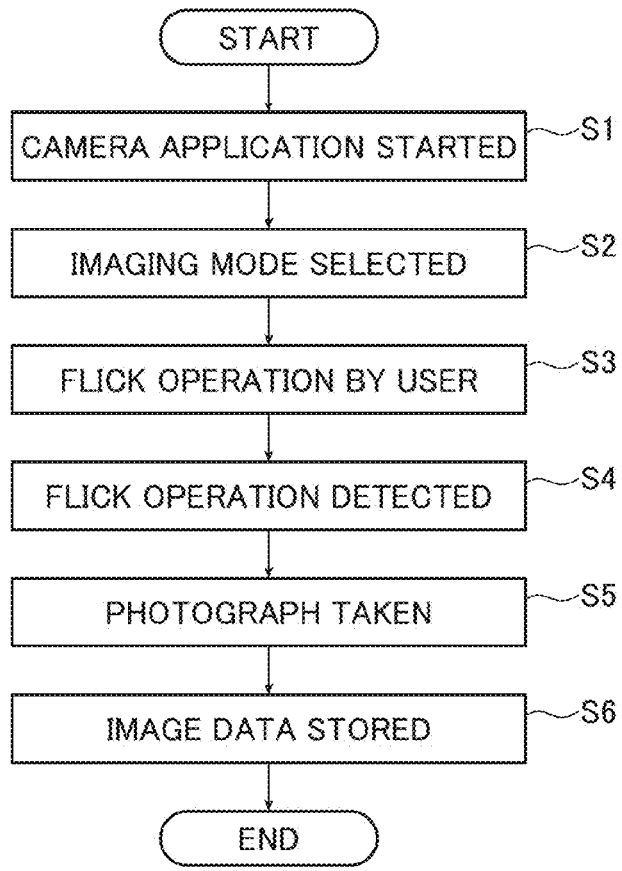
FIG. 4 is a flow chart illustrating operations performed by the imaging device shown in FIG. 1.

Next, a schematic description is made on operations performed on or by the imaging device 10 with reference to the flowchart shown in FIG. 4 according to the imaging method of the invention.

As illustrated in FIG. 1A, there are displayed on the screen of the touch panel 12 icons representing application programs.

With a touch operation, the user taps his/her finger on a given icon to start a camera application program that implements the imaging method of the invention and uses this camera application to take a photograph (Step S1).

Subsequently, the imaging mode setter 18 displays a selection screen for selecting an imaging mode on the screen of the touch panel 12 as the camera application is started.

With a touch operation, the user taps his/her finger on a desired imaging mode among the imaging modes displayed on the imaging mode selection screen to select the imaging mode.

Accordingly, the imaging mode setter 18 sets the imaging mode to the one selected by the user with a touch operation (Step S2).

Now, in the absence of an instruction given by the user with a touch operation (when selection of the imaging mode is canceled), the imaging mode setter 18 retains the imaging mode setting corresponding to the immediately preceding instruction given by the user with a touch operation. Thus, the user can take a photograph in the same imaging mode as the last used mode without the need to select an imaging mode each time he/she starts the camera application.

Displaying the imaging mode selection screen upon starting the camera application is not essential; the user may have the imaging mode selection screen displayed at a desired timing to change the imaging mode.

Subsequently, the user views an image displayed on the touch panel 12 and performs a flick operation at a desired timing for taking a photograph (Step S3).

As illustrated in FIG. 3A, when the user is left-handed and holds the imaging device 10 in his/her left hand to perform a flick operation using his/her left thumb, the left thumb contacts the left side of the screen of the touch panel 12 and is moved on the screen from left to right diagonally downward.

On the other hand, as illustrated in FIG. 3B, when the user is right-handed and holds the imaging device 10 in his/her right hand to perform a flick operation using his/her right thumb, the right thumb contacts the right side of the screen of the touch panel 12 and is moved on the screen from right to left diagonally downward.

Figure 5:
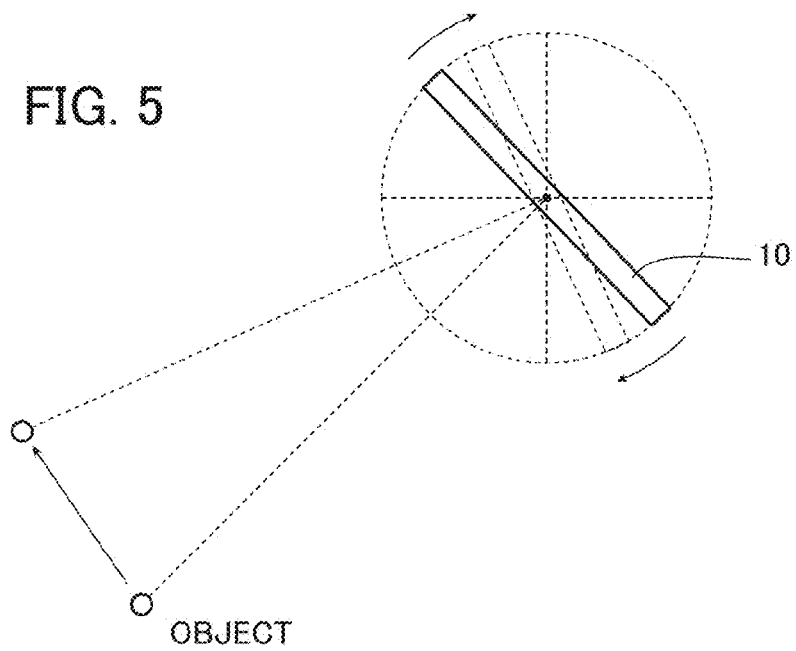
FIG. 5 is a conceptual diagram illustrating flick operation performed on the imaging device shown in FIG. 1, as seen from above.

FIG. 5 is a conceptual diagram illustrating a flick operation performed on the imaging device shown in FIG. 1, as seen from above.

When, for example, the user holds the imaging device 10 in his/her right hand and performs a flick operation using his/her right thumb, the fulcrum is always located at the user himself/ herself, and the point at which force is applied is directed in a direction in which the finger is moved in a flick operation, causing a transverse camera shake so that the position of the user as the subject of a photograph moves as illustrated in FIG. 5. However, when taking a self-portrait, the imaging device 10 turns on its vertical axis about the user and, hence, the user as the subject never moves out of the imaging region.

Thus, taking a photograph with a flick operation can reduce occurrence of camera shake because a light touch on the touch panel can play the role of the shutter button. In addition, a flick operation, which is performed in a direction perpendicular to the direction of a line connecting the subject and the camera, can greatly reduce camera shake attributable to the distance between subject and camera, particularly camera shake occurring when a self-portrait is taken.

Further, because the starting point of a flick operation is the position of any point at which the user's thumb first contacts the touch panel 12, the user need not be given any instruction such as "start flick operation here" displayed on the screen of the touch panel 12 for designating the starting point of the touch operation. Therefore, the user can perform a flick operation in a manner that suits him/her best regardless of whether the user has a long or a short thumb.

When the user performs a flick operation with a finger placed in contact with the right side of the screen of the touch panel 12, the touch operation detector 14 detects a flick operation as the finger is moved on the screen of the touch panel 12 from right to left; when the user's finger is placed in contact with the left side of the screen of the touch panel 12, the touch operation detector 14 detects a flick operation as the finger is moved on the screen of the touch panel 12 from left to right (Step S4).

The touch operation detector 14 can detect a flick operation regardless of the user's dominant hand and therefore obviates the need to produce separate programs for right-handers and left-handers.

There may be a case, for example, where the user holds the imaging device 10 in his/her left hand and performs a flick operation with his/her right index finger or holds the imaging device 10 in his/her right hand and performs a flick operation with his/her left index finger. In such a case, the touch operation detector 14 can likewise detect a flick operation as the user's finger is moved on the screen of the touch panel 12 from right to left or from left to right.

Upon the touch operation detector 14 detecting a flick operation, the imaging controller 20 effects control such that the photography unit 16 takes a photograph according to the imaging mode set by the imaging mode setter 18 (Step S5).

According to this embodiment, the imaging controller 20 effects control such that the photography unit 16 takes a photograph in a period of flick operation detected by the touch operation detector 14, the period lasting while the user moves his/her finger, kept in contact with the screen of the touch panel 12, from when the user touches the finger to the screen of the touch panel 12 and ending when the user lifts the finger off the screen of the touch panel 12.

A photograph may also be taken after the finger is lifted off the screen of the touch panel 12 to terminate a flick operation but a camera shake is then liable to occur. Taking a photograph in a period of a flick operation during which the finger is moved, occurrence of a camera shake can be inhibited.

According to this embodiment, the photography unit 16 takes a photograph in a period during which the finger is moved as described above, and the process of taking a photograph is not achieved when the user lifts the finger off the touch panel 12 before the photography unit 16 takes a photograph.

After the photography unit 16 takes a photograph and the user lifts his/her finger off the touch panel 12 to terminate the flick operation, the image storage 22 stores image data of the taken photograph (Step S6).

After the photography unit 16 takes a photograph, the user may enter text information on the photograph (a title of or a comment on the photograph) before, for example, the image storage 22 stores image data of the taken photograph.

Figure 6A:
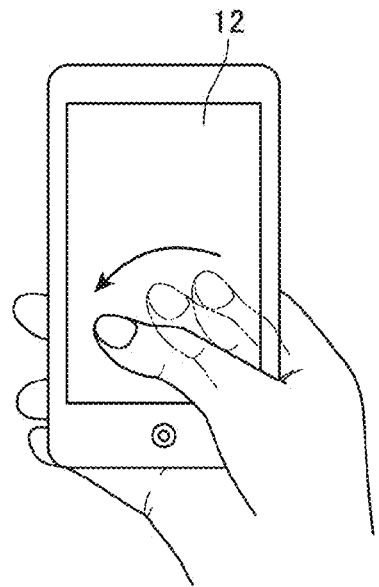
FIGS. 6A, 6B, and 6C are conceptual diagrams illustrating a case of entering text information on an acquired image.
Figure 6B:
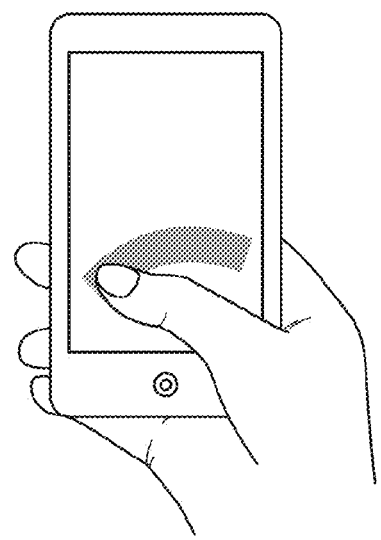
Figure 6C:
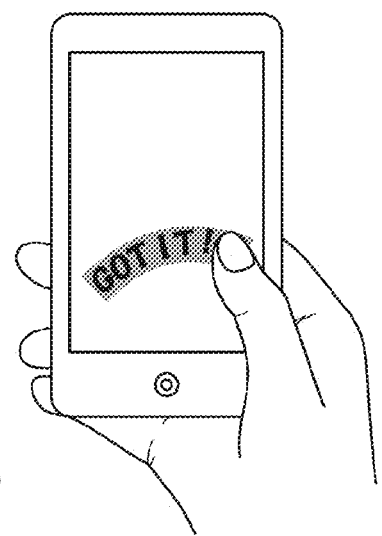

For example, when the user holds the imaging device 10 in his/her right hand and performs a flick operation using his/her right thumb as illustrated in FIG. 6A, the user's right thumb is moved on the screen of the touch panel 12 from right to left. Now, the text information acquirer 24 causes a text information entry region to be displayed in an area over which the user has moved the right thumb kept in contact with the screen of the touch panel 12 as illustrated in FIG. 6B. As illustrated in FIG. 6C, when the user enters text information in the entry region, the text information acquirer 24 acquires the text information entered in the entry region by the user.

The text information may be entered by various input methods such as, for example, handwriting input, a method using a virtual keyboard, and voice input. By handwriting input and voice input, entered handwritten characters (image data) and voice data are converted into text data (text information) by the text information acquirer 24. The imaging device 10 can switch text information input methods as appropriate. When, in particular, a tile to be entered contains a large number of characters, the user is preferably prompted to use voice input.

Text information acquired by the text information acquirer 24 is stored as tag information of image data of a photograph to be stored by the image storage 22 and may be used, for example, as a file name of the image data or for other storing processings by the image storage 22. Further, the text information may be attached as a character image to a photograph taken by the photography unit 16 (image synthesis) or otherwise used for image processings by the image processor 28. When text information is acquired by handwriting input, the handwritten characters (image data) may be attached as such to a photograph.

Upon acquisition of the text information, the text information acquirer 24 can switch, as appropriate, between entry of a title of a photograph taken by the photography unit 16 and entry of a comment on the photograph.

With the imaging device 10, the user can perform a flick operation at any position in the screen of the touch panel 12. Therefore, the text information acquirer 24 may be adapted to permit switching between entry of a title of a photograph and entry of a comment on the photograph according to, for example, a length over which the user moves his/her finger in a flick operation. In such case, the text information acquirer 24 judges that a title is entered when, for example, the user's finger is moved in a flick operation over a distance shorter than a given length and that a comment is entered when the distance is not shorter than the given length.

Because, as described above, text information acquired by the text information acquirer 24 is stored as tag information of image data of a photograph, text information may be used not only as a file name of the image data but for any other purpose after image data is stored by the image storage 22.

When the image processor 28 attaches text information to a photograph as a character image, the text information may be displayed not only in an arbitrary region of a photograph; when a photograph is displayed on a given medium exemplified by the touch panel (display unit) 12 of the imaging device 10, a display window of an application that runs on the imaging device 10, the display unit of another kind of device capable of displaying a photograph, and a hard copy such as a printed material or a printed photograph, the text information may also be attached to a region other than the display region of the photograph displayed on the given medium. In the case of an electronic photograph album, for example, the text information may be displayed by being attached as a title of or comment on a photograph to a region other than the display region of the photograph displayed in the electronic photograph album.

Further, the image processor 28 may be adapted to first process or edit the text information, specifically, color, font, size, deformation, rotation, scaling, and displacement, and the like and thereafter attach the processed or edited text information to a photograph taken by the photography unit 16.

The text information may be likewise entered by a flick operation performed by moving a finger from left to right or from the upper side downward in addition to the finger movement made from right to left.

Using the same finger for entering text information as used for the flick operation is not essential. After a flick operation is performed with the right thumb, text information may be entered with another finger.

Text information may also be entered after the image data of a photograph is stored by the image storage 22 to change the tag information of the image data of the stored photograph or attach the text information to the stored photograph as a character image.

The user can focus on a desired position in the imaging region by moving the focus frame displayed in the screen of the touch panel 12 without the need to move the imaging device 10.

Figure 7A:
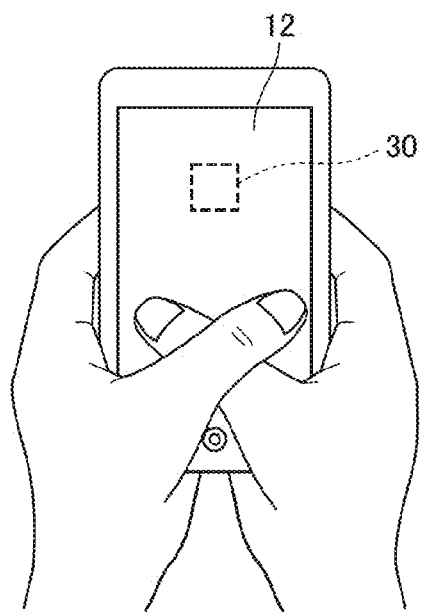
FIGS. 7A and 7B are conceptual diagrams illustrating a case of moving a focus frame up and downward.
Figure 7B:
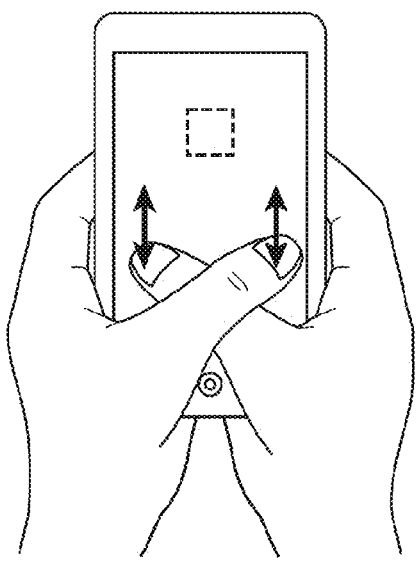

As illustrated in FIG. 7A, for example, when the user holds the imaging device 10 in both hands, with both thumbs crossed and placed in contact with the screen of the touch panel 12, the touch operation detector 14 detects that the user has placed the two fingers in contact with the screen of the touch panel 12, whereupon the focus frame setter 26 displays a focus frame 30 on the screen of the touch panel 12. When the user moves both thumbs, kept in contact with the screen of the touch panel 12, up and downward as illustrated in FIG. 7B, the position of the focus frame 30 in the screen of the touch panel 12 is moved up and downward according to the direction in which both thumbs are moved.

Figure 8A:
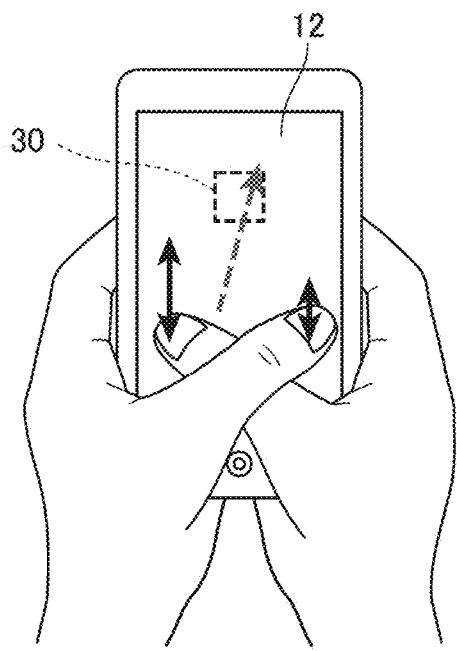
FIGS. 8A and 8B are conceptual diagrams illustrating a case of moving a focus frame in an oblique direction.
Figure 8B:
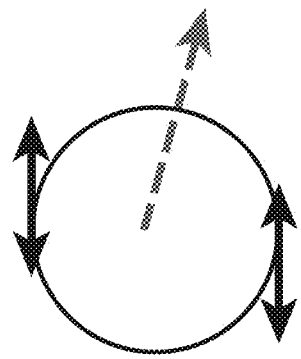
Figure 9:
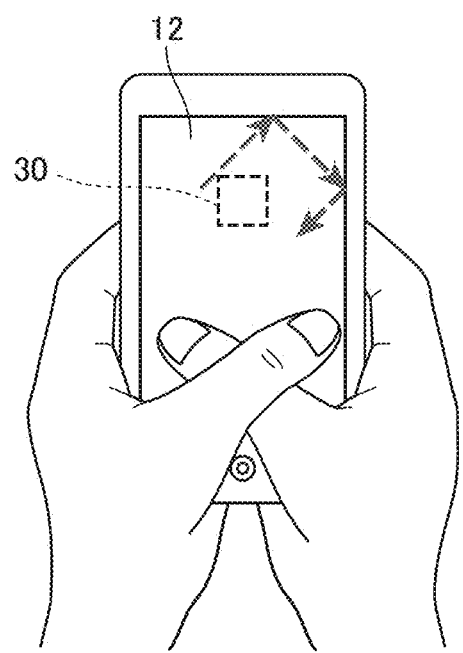
FIG. 9 is a conceptual diagram illustrating a focus frame hitting an edge of the touch panel screen and, after bouncing off edges, being moved in the opposite direction.

When the user moves one of the thumbs upward and the other thumb downward on the screen of the touch panel 12 as when operating the steering wheel of an automobile as illustrated in FIGS. 8A and 8B, the focus frame 30 is moved in a diagonal direction accordingly. When, for example, the user moves the crossed thumbs upward as illustrated in FIG. 7B, thereafter moving the right thumb upward and the left thumb downward on the screen of the touch panel 12 as illustrated in FIGS. 8A and 8B, the focus frame 30 moves accordingly diagonally upward to the right on the screen of the touch panel 12.

When the focus frame 30 is moved to reach an edge of the screen of the touch panel 12, the focus frame 30 bounces off edges and is moved in the opposite direction.

When the focus frame 30 has been located in a desired position, the user gently lifts one of the crossed thumbs off the screen of the touch panel 12. This determines the position of the focus frame 30 in the screen of the touch panel 12, i.e., the focus position in the imaging region displayed on the screen of the touch panel 12. Now, when the user performs a flick operation with the thumb still placed in contact with the screen of the touch panel 12, a photograph is taken with the focus set in the position defined by the focus frame 30.

For the user to cross the thumbs when setting the focus frame 30 is not essential. When the thumbs are not crossed, fingers of both hands supporting the imaging device 10, an index finger, for example, may move as the thumb moves, and, thus, the center of gravity of the imaging device 10 (fulcrum) may be displaced left or rightward. When the thumbs are crossed, the center of gravity of the imaging device 10 can be positioned at the center of the screen of the touch panel 12, which prevents the imaging device 10 from shaking.

The touch operation detector 14 does not detect whether the user's thumbs are crossed. Therefore, positioning the focus frame 30 is possible regardless of whether the thumbs are crossed or not. However, when the thumbs are not crossed so that the thumbs (points to which force is applied) are apart to the left and to the right, a flick operation is difficult to perform after positioning of the focus frame 30. For this reason and in consideration of the problem of displacement of the center of gravity of the imaging device 10, the thumbs are preferably crossed when the focus frame 30 is positioned.

Figure 10A:
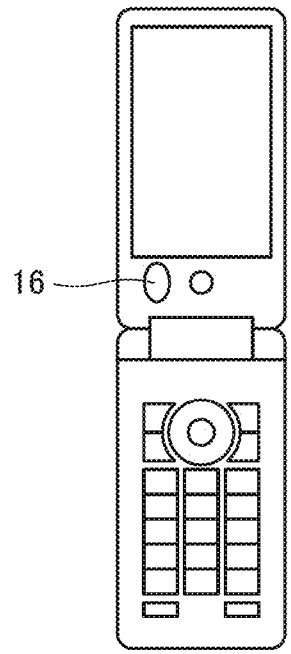
FIGS. 10A and 10B are conceptual diagrams showing positions of a camera provided in a folding portable terminal.
Figure 10B:
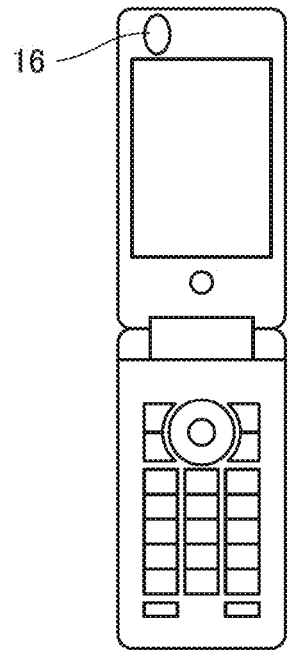

Some folding-type portable terminals permitting key operations are provided with a camera for taking a self-portrait beneath the monitor screen as illustrated in FIG. 10A or above the monitor screen as illustrated in FIG. 10B. Because folding-type portable terminals have operating keys separate from the monitor screen, the user can operate the keys without regard to the position of the camera.

Figure 11A:
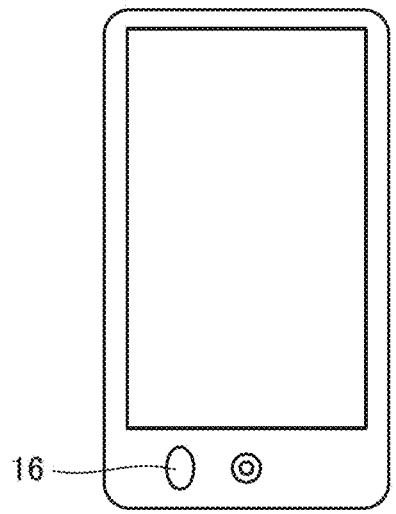
FIGS. 11A and 11B are conceptual diagrams showing positions of a camera provided in a touch-panel portable terminal.
Figure 11B:
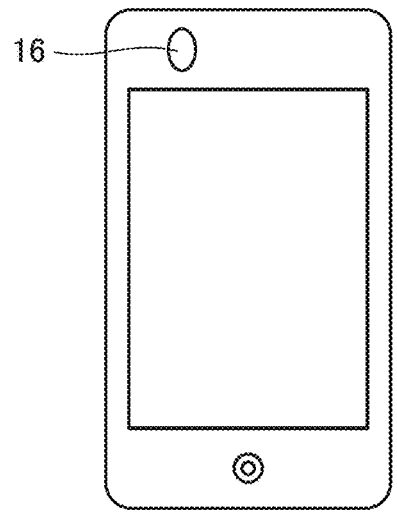

As illustrated in FIGS. 11A and 11B, touch-panel portable terminals, not of folding type, may also have a camera for taking a self-portrait beneath or above the screen of the touch panel. When a touch-panel portable terminal has a camera provided beneath the screen of the touch panel, then each time the user performs an operation using a finger, the focus of the camera is automatically placed on that finger, namely a close position, making a flick operation impossible.

An operation with the thumbs crossed as described above is also impossible with a touch panel portable terminal when a camera is provided beneath the screen of the touch panel because the light receiving unit of the camera would be thereby hidden. In such case, the portable terminal may be, for example, positioned upside downward, to enable a flick operation and a thumbs-crossed operation without hindering the camera function. When a photograph is taken with the portable terminal positioned upside down, the orientation of the taken photograph needs to be reversed by the image processor 28.

Further, when implementation of the invention is given precedence on the assumption that the camera position cannot be uniquely determined depending on the design of individual portable terminals, it is preferable that touch operations in the invention can be used without hindering reception of light and measuring performed by the camera. Therefore, the present invention takes consideration of cases in which the portable terminal (imaging device 10) is used in landscape position or, as described above, in an upside-down position. When, for example, the portable terminal is made smaller and thinner, and the camera is located on a lateral side of the portable terminal or externally provided, it is preferable that the invention can still be implemented likewise.

Starting and using a camera application to take a photograph is not essential. Where the imaging device 10 is a digital camera, the situation is comparable to the imaging device 10 being a portable terminal such as a smartphone with a camera application already started.

The imaging method of the invention can also be implemented by means of, for example, a program for causing a computer to execute each step of the imaging method. The program may be provided, for example, as recorded on a computer readable recording medium.

This invention is basically as described above.

While the present invention has been described above in detail, the invention is not limited to the above embodiments, and various improvements and modifications may be made without departing from the spirit and scope of the invention.

We claim:

1. An imaging device comprising:
   a touch panel adapted to receive an instruction entered by a user with a touch operation by touching his/her finger to a screen,
   a touch operation detector adapted to detect the touch operation entered through the touch panel,
   an image acquirer adapted to acquire an image,
   an imaging controller adapted to effect control such that the image acquirer acquires the image when the touch operation detector detects a flick operation, as the touch operation, in which the user lifts his/her finger off the screen of the touch panel after moving the finger over the screen, with the finger kept in contact with any position on the screen, and an imaging mode setter adapted to set an imaging mode in which the image acquirer acquires the image according to an instruction given by the user with a touch operation, wherein the imaging controller effects control such that the image acquirer acquires the image according to the imaging mode set by the imaging mode setter, wherein the imaging mode setter comprises the imaging mode for acquiring a single image with a single flick operation, and wherein, in the imaging mode for acquiring the single image, the image is acquired with a multiple exposure by performing a multiple flick operation whereby the user repeats steps of moving his/her finger over the screen of the touch panel with the finger kept in contact with the screen, stopping moving the finger, and moving the finger back in an opposite direction with the finger kept in contact with the screen.

2. The imaging device according to claim 1, wherein the imaging controller effects control such that the image acquirer acquires an image in a period of the flick operation detected by the touch operation detector, the period lasting while the user moves his/her finger, kept in contact with the screen of the touch panel, from when the user touches the finger to the screen of the touch panel and ending when the user lifts the finger off the screen.

3. The imaging device according to claim 1, further comprising a text information acquirer that, upon the touch operation detector detecting the flick operation, causes an entry region for entering text information for an image acquired by the image acquirer to be displayed in an area over which the user has moved his/her finger kept in contact with the screen of the touch panel, to acquire the text information entered by the user in the entry region.

4. The imaging device according to claim 3, wherein the text information is entered by handwriting input, by using a virtual keyboard, or by voice input.

5. The imaging device according to claim 3, wherein the text information is a title of the image or a comment on the image.

6. The imaging device according to claim 5, wherein the text information acquirer switches between entry of the title of the image and entry of the comment on the image according to a length over which the user has moved his/her finger in the flick operation.

7. The imaging device according to claim 3, further comprising an image processor adapted to attach text information acquired by the text information acquirer as a character image to an image acquired by the image acquirer.

8. The imaging device according to claim 7, wherein the image processor attaches the text information to an arbitrary region in the image acquired by the image acquirer or to a region other than a display region of the image displayed on a given medium.

9. The imaging device according to claim 7, wherein the image processor attaches the text information to the image acquired by the image acquirer after processing and editing the text information.

10. The imaging device according to claim 7, wherein when the image is acquired by the image acquirer, with the imaging device held in an upside-down position, the image processor reverses an orientation of the acquired image upside downward.

11. The imaging device according to claim 7, further comprising an image storage adapted to store image data of the image acquired by the image acquirer as the user lifts his/her finger off the touch panel upon completing the flick operation or image data of the image having undergone image processing by the image processor.

12. The imaging device according to claim 11, wherein the image storage stores the text information acquired by the text information acquirer as tag information of image data of the image stored by the image storage.

13. The imaging device according to claim 1, further comprising a focus frame setter that, upon the touch operation detector detecting that the user has placed his/her two fingers in contact with the screen of the touch panel, causes a focus frame for determining a focusing position in an imaging region to be displayed in the screen of the touch panel and, when the user moves the two fingers kept in contact with the screen of the touch panel, causes the focus frame to move according to a direction in which the two fingers move.

14. The imaging device according to claim 1, wherein, in the absence of a new instruction given by the user with the touch operation, the imaging mode setter retains an imaging mode setting corresponding to a prior instruction given by the user with an immediately preceding touch operation.

15. The imaging device according to claim 1, wherein in the imaging mode for acquiring the single image, a shutter speed at which the image acquirer acquires the image is changed according to a speed at which the user moves his/her finger in the flick operation.

16. The imaging device according to claim 1, wherein the imaging mode setter comprises a first imaging mode for acquiring a plurality of images with a single flick operation under same imaging conditions.

17. The imaging device according to claim 1, wherein the imaging mode setter comprises a second imaging mode for acquiring a plurality of images with a single flick operation by changing a shutter speed.

18. The imaging device according to claim 1, wherein the imaging mode setter comprises a third imaging mode for applying image processing to a plurality of images acquired with a single flick operation.

19. The imaging device according to claim 1, wherein the imaging mode setter comprises a fourth imaging mode for acquiring a plurality of images with a single flick operation, either with or without flash.

20. The imaging device according to claim 1, wherein, when the user's finger is placed in contact with a right side of the screen of the touch panel, the touch operation detector detects the flick operation as the finger is moved on the screen of the touch panel from right to left; when the user's finger is placed in contact with a left side of the screen of the touch panel, the touch operation detector detects the flick operation as the finger is moved on the screen of the touch panel from left to right.

21. The imaging device according to claim 1, wherein the imaging controller is constituted by a program that is started by the user with the touch operation.

22. The imaging device according to claim 1, wherein the imaging controller is constituted by a program that is started by the user with the touch operation, wherein the imaging mode setter displays a selection screen for selecting the imaging mode on the screen of the touch panel upon starting of the program and sets the imaging mode selected by the user with the touch operation.

23. An imaging method comprising:

an instruction input step of receiving an instruction entered by a user with a touch operation by touching his/her finger to a screen of a touch panel, a touch operation detection step of detecting the touch operation entered in the instruction input step, an imaging control step of effecting control such that the image is acquired when a flick operation is detected as the touch operation in the touch operation detection step, in which flick operation the user lifts his/her finger off the screen of the touch panel after moving the finger over the screen with the finger kept in contact with any position on the screen, and an imaging mode setter step of setting an imaging mode in which the image is acquired according to an instruction given by the user with a touch operation, wherein the imaging control step effects control such that the image is acquired according to the imaging mode set by the imaging mode setter step, wherein the imaging mode setter step comprises the imaging mode for acquiring a single image with a single flick operation, and wherein, in the imaging mode for acquiring the single image, the image is acquired with a multiple exposure by performing a multiple flick operation whereby the user repeats steps of moving his/her finger over the screen of the touch panel with the finger kept in contact with the screen, stopping moving the finger, and moving the finger back in an opposite direction with the finger kept in contact with the screen.

24. A non-transitory computer readable recording medium having recorded thereon a program adapted to cause a computer to execute each of the steps of the imaging method according to claim 23.

* * * * *